United States Patent
Vrenken et al.

(10) Patent No.: US 11,399,049 B2
(45) Date of Patent: Jul. 26, 2022

(54) SYSTEM AND METHOD FOR STREAMING CONTENT

(71) Applicant: Atos Information Technology GmbH, Munich (DE)

(72) Inventors: Peter Vrenken, Ahlen (DE); Erwin Tanger, Delbrueck (DE); Andreas Horn, Paderborn (DE); Jens Nolte, Paderborn (DE)

(73) Assignee: ATOS FRANCE, Bezons (FR)

( * ) Notice: Subject to any disclaimer, the term of this patent is extended or adjusted under 35 U.S.C. 154(b) by 0 days.

(21) Appl. No.: 17/332,944

(22) Filed: May 27, 2021

(65) Prior Publication Data

US 2021/0377324 A1    Dec. 2, 2021

(30) Foreign Application Priority Data

May 29, 2020  (EP) .................................... 20177520

(51) Int. Cl.

| | |
|---|---|
| *G06F 15/16* | (2006.01) |
| *H04L 65/61* | (2022.01) |
| *G06T 17/20* | (2006.01) |
| *H04L 67/568* | (2022.01) |
| *H04L 67/01* | (2022.01) |

(52) U.S. Cl.
CPC ........ *H04L 65/4069* (2013.01); *G06T 17/205* (2013.01); *H04L 67/2842* (2013.01); *H04L 67/42* (2013.01)

(58) Field of Classification Search
CPC . H04L 65/4069; H04L 67/2842; H04L 67/42; H04L 65/4084; H04L 65/80; H04L 65/602; H04L 65/4015; H04L 67/38; G06T 17/205; H04N 13/10; H04N 21/2343

See application file for complete search history.

(56) References Cited

U.S. PATENT DOCUMENTS

| | | | | |
|---|---|---|---|---|
| 9,998,705 | B2* | 6/2018 | Cullen | H04N 7/141 |
| 10,305,955 | B1* | 5/2019 | Li | H04L 65/4084 |
| 11,094,117 | B2* | 8/2021 | Bell | G06T 3/40 |
| 2011/0254917 | A1* | 10/2011 | Schaffer | H04N 21/2662 |
| | | | | 348/E13.001 |
| 2018/0077210 | A1* | 3/2018 | Hannuksela | H04N 21/23439 |

OTHER PUBLICATIONS

European Search Report issued in EP20177520.2 dated Nov. 20, 2020 (10 pages).

* cited by examiner

*Primary Examiner* — Cheikh T Ndiaye
(74) *Attorney, Agent, or Firm* — Arc IP Law, PC; Joseph J. Mayo

(57) ABSTRACT

A method for streaming content that includes loading the content on a streaming server wherein the streaming server is designed to generate models of the content and model updates. Generating the model updates is based on the models, acquired client metrics containing viewing device specific information and a client state containing information about previously transmitted model updates. Transmitting the model updates to a viewing device. Providing the content for visualization according to the model updates.

13 Claims, 5 Drawing Sheets

SYSTEM AND METHOD FOR STREAMING CONTENT

BACKGROUND OF THE INVENTION

Field of the Invention

At least one embodiment of the invention relates to a system and a method for streaming content.

Description of the Related Art

Nowadays, three-dimensional (3D) content streaming devices becomes ever more important. A few of the digital transformations across our globe predict and promise solutions in which 3D visualizations are central components of the toolset of many of tomorrow's work forces. Digital Twins, Augmented, Mixed and Virtual Reality and even Virtual Assistants by design contain the need to have 3D content in high quality available on the devices.

However, many of the involved devices are mobile devices, e.g. 3D holographic viewing devices, for which reason they are constrained in their resources. E.g. they don't have as much memory, storage, bandwidth, computation performance and visual performance compared to desktops and laptops. Mobile devices are not able to interpret the same amount of 3D content as desktop/server based systems can. As 3D models are complex and may become huge, loading, processing and visualizing these models sometimes needs too much time and processing resources. In addition, different mobile devices also vary a lot in how constrained they are in their resources.

Furthermore, mobile devices may not have a high-speed/low-latency connection. The connectivity of mobile devices is also not consistent due to a limited availability and a limited quality of networks. A limited quality can e.g. cause interruptions and/or disturbances due to fluctuations of a transmission speed of the connection. Hence, the user experience during processing and visualization of a 3D model can become inconvenient.

One known approach is Remote Edge/Cloud based rendering which is based on full application rendering on the server side. In this case, the client side comprises a simple pass-through application. Thus, this approach requires a high bandwidth and isn't usable in low bandwidth situations. It is also highly sensitive for latency. A high latency or a fluctuating latency could become devastating for the whole visualization.

Another known solution is Quad/Octree/Tile based Level of Detail (LOD) sending. In this case the full application rendering is performed on the client side while segments of content to be streamed and information about a LOD of the segments are stored on the server side before they are sent to the client side. As a segmented LOD still can involve switching out complete models, this approach is not granular/adaptive enough to optimize for the available bandwidth, computation performance and memory/storage of resource constrained devices.

Preparative 3D model transcoding involves the creation of different 3D datasets optimized for each device or family of devices. However, it is still impossible to have superior quality for all object levels (i.e. the whole car and a specific screw in the engine). Also, the data still needs to be sent to the consuming device completely before visualization can start. Animations and interactions change the requirements for 3D content, which transcoding is unable to consider.

Hybrid transcoding for adaptive transmission of 3D content is characterized by client-side preselection of modalities that should be prioritized. As most of the decision making is done on the client side, scalable server-side components are not exhausted.

Progressively Ordered Primitive Buffer streaming is a method to stream 3D content to web browsers based on an improvement of the content whenever new information arrives. This method is mostly object oriented and therefore less suited for streaming big models like environments or maps. Also, it does not take into account client-side, server-side and connection metrics whilst streaming.

There is a need for new concepts that enables applications to visualize 3D models even on small devices quick enough in an efficient manner.

BRIEF SUMMARY

It is an objective of the present invention to provide an improved system and an improved method for streaming 3D content. This objective is solved by a system for streaming content and a method for streaming content according to the independent claims, respectively. Advantageous embodiments are characterized by dependent claims.

A system for streaming content comprises a streaming server and a viewing device. The streaming server comprises a generation module, a decision module, a client state manager and a telemetry aggregation cache. The viewing device comprises an engine and an acquisition module. The generation module is designed to generate models of imported content. The decision module is designed to generate model updates. The streaming server is designed to transmit the model updates to the viewing device. The client state manager is designed to store a client state containing information about previously transmitted model updates. The acquisition module is designed to acquire client metrics containing viewing device specific information and to continuously transmit the client metrics to the telemetry aggregation cache. The decision module is designed to generate the model updates based on the models client metrics and the client state. The engine is designed to visualize the content based on the model updates.

By taking the relevant decisions on the decision making module of the streaming server the relevant algorithms do no longer need to run on the viewing device, advantageously. Instead a high computing performance is available on the streaming server. Thus, a resource pressure is removed from the constrained viewing devices like mobile devices. The system enables the usage of all content types, e.g. huge objects comprising a high quality or e.g. detailed maps. Especially, the system enables streaming of 3D content. Also, all types of viewing devices can be used to stream the content.

As the streaming server is able to scale almost indefinitely in resources (ram/compute/storage) and isn't restricted by a mobile operating system, it can be much easier to prepare the content for the viewing device, to implement new features and to optimize existing features. The system may also comprise a plurality of viewing devices. Having the models on the streaming server advantageously allows shared viewing of dynamic content and shared editing of content.

As the system can take client metrics into account when generating the model updates, the system allows to adaptively stream content, e.g. according to viewing device specific limitations. The system is designed to conditionally transfer and visualize only the part of the content which is required at a given moment according to client metrics instead of being designed to load the content and to store the whole model before starting processing. Different parts of the content may also be prepared such that they comprise different quality levels.

In an embodiment the acquisition module is designed to acquire client metrics containing information about available resources of the viewing device. In order to make optimal usage of available device resources like CPU, (video) memory and storage, the system is able to adapt the visualization according to these resources. The client metrics are acquired and taken into account in the generation of the model updates. Advantageously, the system is able to scale according to available resources of the viewing device 3 and change the quality/quantity of visualization by generating appropriate model updates when only limited resources are available. Thus, the system can adapt for a specific situation. Advantageously, this enables the best quality of 3D content on mobile devices with limited resources. If the system 1 comprises a plurality of viewing devices 3, the system 1 can adopt the quality/quantity, depending on resources of the different viewing devices 3.

The system is designed to use client side resources as optimal as possible and introduces optimizations enabled by scaling the streaming of server-side content and/or models. These two factors combined can facilitate an unthrottled client-side content performance.

In an embodiment the acquisition module is designed to acquire metrics containing information about a connectivity of the viewing device. Advantageously, a size and a complexity of the model updates may be adapted to the connectivity, as the system is aware of device connectivity like bandwidth and latency. Thus, the system can be operated in low-bandwidth and in high-latency situations. If e.g. interruptions occur or the bandwidth gets throttled the visualization of the content can be still active. If the connection to the streaming server would be severed the visualization can still continue. However, it won't be changed/improved anymore but the (3D) rendering can continue. The system is also able to scale according to a connectivity and e.g. pause/reduce the quality when not enough bandwidth is available. Thus, the best (3D) content is available for a specific connection situation of mobile devices with limited connectivity.

Furthermore, the content can be visualized immediately and constantly without first transferring a lot of data. This can be realized by starting a stream with low-quality and/or only parts of the available content. Viewing can start immediately without requiring to load the full model first. The system enables a balance between (3D) visualization quality and quantity on constrained mobile devices. By optimizing the (3D) content for each device/connectivity setup individually and constantly the system makes it possible to visualize content without the usual problems/lags in visualization.

In an embodiment the acquisition module is designed to acquire client metrics containing information about a pose, a movement and a view frustum of the viewing device. The pose consists of a position and rotation of the viewing device. Advantageously, the content may be visualized according to motion profile of a user of the viewing device. Thus, a user may e.g. move around a 3D object and look at it from different perspectives and/or distances.

In an embodiment the viewing device comprises a protocol interpreter designed to provide instructions according to the model updates for a mesh updater of the viewing device. The mesh updater is designed to update a mesh of content to be visualized according to the instructions.

In an embodiment the mesh updater is designed to translate a transport protocol specific format of the updated mesh into an engine specific mesh. The viewing device comprises a storage designed to store and load the engine specific mesh. The engine is designed to visualize the content based on the engine specific mesh. Advantageously, the updated mesh can be adapted and optimized with respect to characteristics of the viewing device.

In an embodiment the streaming server comprises a queue module designed to queue model updates before they are transmitted to the viewing device. As client and network conditions change the streaming server locally queues model updates before they are sent to the viewing device. Sending the model updates to the viewing device can be performed asynchronously. If the decision module decides—based on the metrics and client state—that model updates should not be send anymore, they get removed from the queue and/or replaced by further model updates.

The queueing module does not introduce much latency but ensures that in case of changes the data that should be transmitted to the viewing device can be altered as dynamic as possible.

In an embodiment the generator module is designed to modify the models according to external model conditions provided by an interaction module of the streaming server. The decision module is designed to consider the modified models when generating the model updates. The External model conditions may e.g. comprise information about a transformation of at least one object to be visualized.

In an embodiment the viewing device comprises a cache provided for storing model updates. Advantageously, an upcoming visualization may be prepared by storing model updates. Also, this allows for disconnected viewing by intelligently parsing the content and corresponding metadata without any interaction with the streaming server. Furthermore, reapplication of content for a multitude of use cases is possible without a complex preprocessing workflow and/or manual labor.

A method for streaming content comprises the following steps. A content is loaded on a streaming server. Models of the content are generated. Model updates are generated based on the models. The model updates are transmitted to a viewing device. The content is visualized according to the model updates. Generating the model updates is based on acquired client metrics containing viewing device specific information and a client state containing information about previously transmitted model updates.

In an embodiment model updates contain information about a change of quantity and quality of the content according to the client metrics. Advantageously, the quantity and quality is adapted to available client-side resources and the connectivity of the viewing device.

In an embodiment the model updates are queued before being transmitted to the viewing device. Advantageously, the system may complement, remove or change an order of queued model updates. Thus, the system can react to changing situations and adapt an upcoming visualization of the content.

In an embodiment parts of the model updates referring to a view frustum are transmitted in a prioritized manner. This kind of sequence of model updates ensures that fragments of a model that are within the view frustum are prioritized and are therefore send to the viewing device before non-frustum fragments.

In an embodiment model updates referring to parts of the content that are to be visualized in a foreground are transmitted in a prioritized manner. This may also be called occlusion-based sequencing. In this embodiment, parts that are behind a visible content get a lower priority and are therefore send later to the viewing device. As the streaming server takes into account the camera translation, rotation and view frustum it can correct the priority of fragments as long as they are queued on the streaming server and not yet send.

The net effect of this approach is that objects and/or parts of objects a viewer is looking at get prioritized and additional updates that happen at boundaries of the view frustum and/or behind an object are delayed.

BRIEF DESCRIPTION OF THE DRAWINGS

The above-described properties, features and advantages of this invention and the way in which they are achieved are explained in greater detail in association with the drawings below. In a schematic illustration.

DETAILED DESCRIPTION OF THE INVENTION

Figure 1:
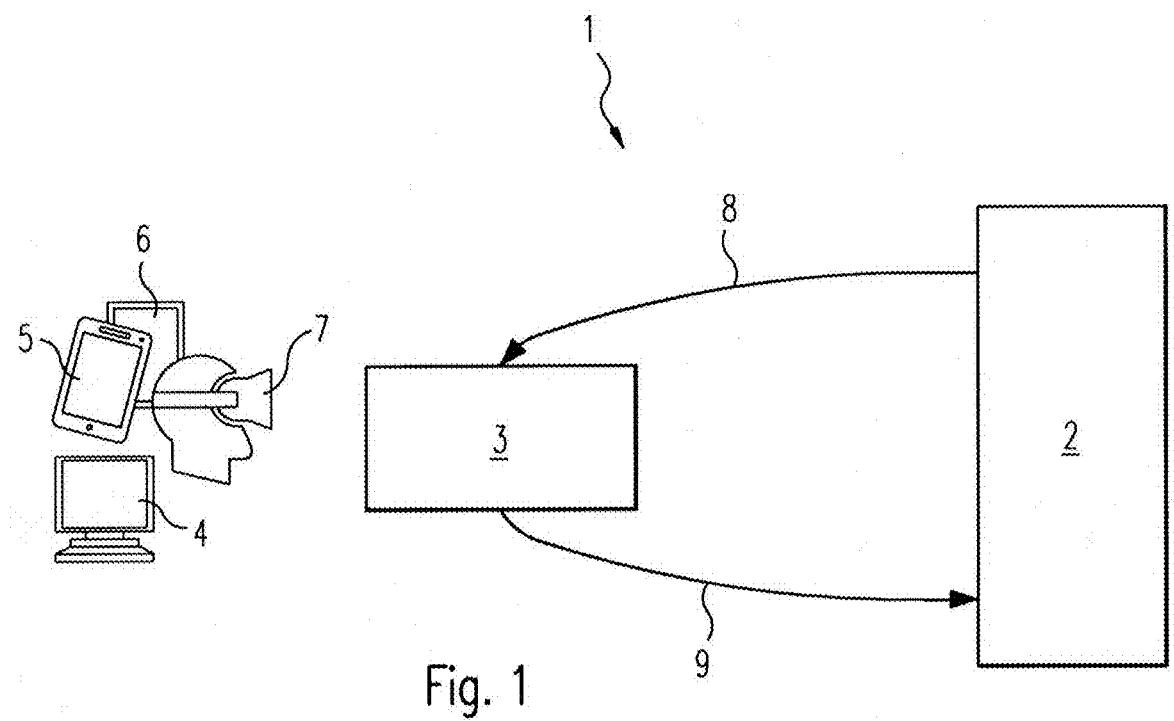
FIG. 1 shows a system for streaming content comprising a streaming server and a viewing device.

FIG. 1 schematically shows elements of a system 1 for streaming content.

The system 1 comprises a streaming server 2 and a viewing device 3. The system 1 may also comprise a plurality of viewing devices 3. The streaming server 2 provides a streaming service which may be hosted on a computer, in a cloud, an edge device or any other device. The viewing device 3 is designed to visualize streamed content. The viewing device 3 may be any device, e.g. a computer 4 or a mobile device, e.g. a smart phone 5, a tablet 6 or a head-mountable display 7 (HMD), e.g. wearable glasses e.g. with augmented reality/virtual reality capabilities.

The streaming server 2 and the viewing device 3 are designed to exchange data with each other. A first connection 8 is designed to transmit data from the streaming server 2 to the viewing device 3. A second connection 9 is provided for transmitting data from the viewing device 3 to the streaming server 2.

Figure 2:
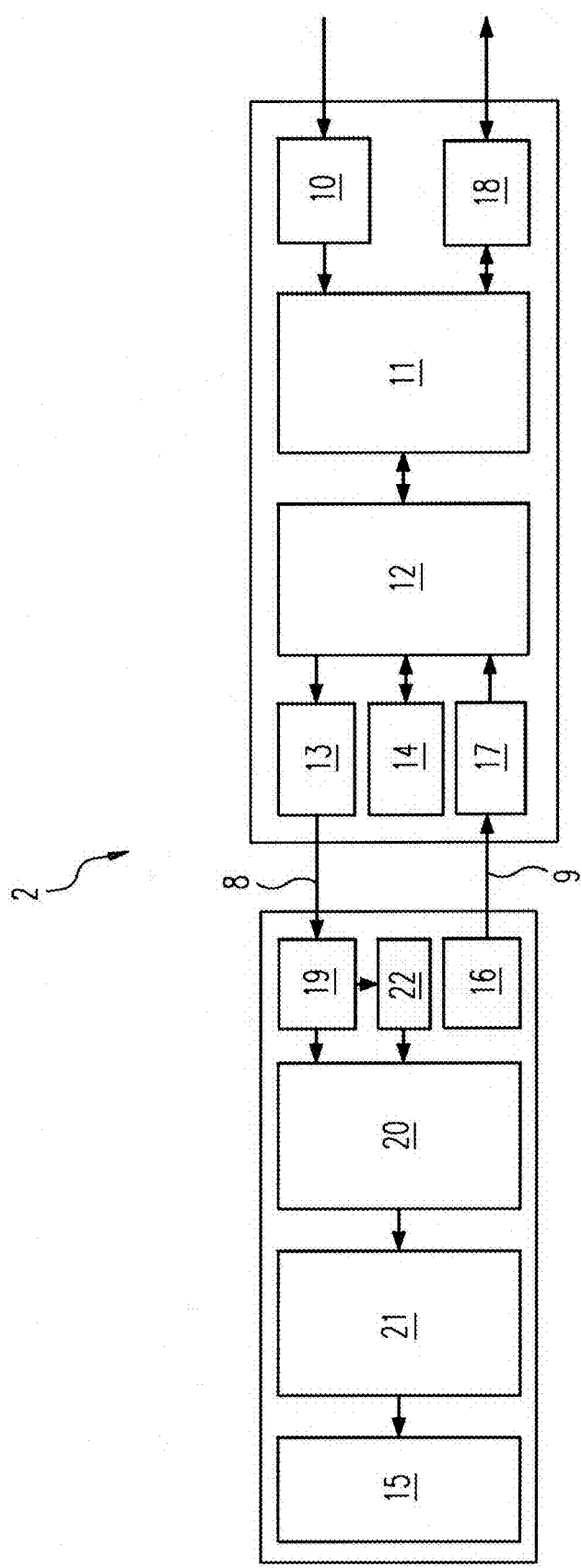
FIG. 2: shows components of the streaming server and the viewing device.

FIG. 2 schematically shows components of the streaming server 2 and the viewing device 3 of the system 1.

The streaming server 2 comprises an import module 10 designed to import content to be streamed and visualized. The import module 10 may be triggered by means of an external signal to load the content. The content may be any content, e.g. three-dimensional (3D) content. The content can be provided as point clouds or in any other formats, e.g. in a standard 3D format. The exact format of the content depends on the import module 10 used.

The streaming server 2 comprises a generating module 11. The generating module 11 is designed to generate models of the imported content. The imported content is converted into a model that is algorithm-specific for the whole streaming process. The models can be kept in-memory. The models contain all data needed to upscale and/or downscale fragments of the content and all the algorithmic logic needed to quickly provide specific fragments to serve to the client side. Generating a model can comprise generating a Level of Detail (LOD) tree using conventional spatial layouting algorithms (i.e. quad-tree/R-tree etc.). The model is structured in a way to support the decision-making algorithms as good as possible.

The streaming server 2 comprises a decision module 12. The decision module 12 is designed to generate model updates. The streaming server 2 is designed to transmit the model updates to the viewing device 3. The streaming server 2 and the viewing device 3 are connected with each other by the first connection 8, which can be e.g. based on a guaranteed protocol, e.g. the first connection 8 can be a Transmission Control Protocol (TCP) based connection.

Before transmitting model updates to the viewing device 3, the model updates may be queued locally. For this, the streaming server 2 comprises a queue module 13 designed to queue model updates before they are transmitted to the viewing device 3. The queue module 13 allows removal of model updates from the queue and/or replaced them by further model updates. The queue module 13 may be omitted.

To make it possible for the system 1 to decide which model updates need to be send, the system 1 needs to know what data was already sent. For this, the streaming server 2 comprises a client state manager 14 designed to store a client state containing information about previously transmitted model updates. Thus, the decision module 12 can generate model updates according to the client state. The system 1 maintains unique identifiers of different parts of a model and its quality that the streaming server 2 has already sent. This reflects the client state which is read and updated by the client state manager 14.

The viewing device 3 comprises an engine 15 designed to visualize the content based on the model updates. Furthermore, the viewing device 3 comprises an acquisition module 16 designed to acquire client metrics containing viewing device specific information. Each client metric consists of a timestamp and a value. The acquisition module 16 is also designed to continuously transmit the client metrics to a telemetry aggregation cache 17 of the streaming server 2 via the second connection 9 if the decision module 12 is requesting client metrics. Thus, the client metrics can be provided to the decision module 12. The second connection 9 can transmit client metrics without a guaranteed delivery, e.g. the second connection 24 may be a User Datagram Protocol (UDP) based connection. The second connection 9 can transmit client metrics at a dynamic interval and in a very compact form. This can reduce a bandwidth pressure. The acquisition module 16 is also designed to decide which client metric is important and therefore has to be send to the telemetry aggregation cache 17. The telemetry aggregation cache 17 is designed to keep at least a latest version of the client metrics.

The acquisition module 16 may be designed to acquire client metrics containing information about available resources of the viewing device 3, like e.g. CPU, (video) memory and storage. The decision module 12 continuously runs an algorithm that considers the client metrics and decides for which part of a model a specific quality representation should be transmitted. As the decision module 12 is designed to generate the model updates based on the client metrics, the system 1 is able to adapt the visualization to a viewing device 3 which comprises limited available resources. This enables the best quality (3D) content possible on mobile devices with limited resources.

The acquisition module 16 may also be designed to acquire client metrics containing information about a connectivity of the viewing device 3. As the decision module 12 is designed to generate the model updates based on the client metrics, the system 1 can be operated in low-bandwidth and in high-latency situations. This enables the best quality (3D) content possible on mobile devices with limited connectivity.

The acquisition module 16 may also be designed to acquire client metrics containing information about a pose, a movement and a view frustum of the viewing device 3. A pose consists of a position and a rotation of the viewing device. This e.g. allows to consider a motion of a user of the viewing device 3 when visualizing objects. Thus, the user can look at objects from different locations.

The acquisition of the client metrics can be performed on a low-priority background thread continuously. The transmission of client metrics can be performed in temporal distances which can be changed when resources or connectivity become more critical. E.g., an interval between the transmissions of client metrics to the telemetry aggregation cache 17 can be increased if enough resources are available and the connectivity is good, whilst when resources become scarce or the connectivity bad, the interval can be decreases.

The streaming server 2 may also comprise an interaction module 18. The generation module 11 is designed to modify the models according to external model conditions provided by the interaction module 18. In this case, the decision module 12 is designed to consider the modified models when generating the model updates, too. The External model conditions may e.g. comprise information about a transformation of at least one object to be visualized by the system. The transformation of at least one object can e.g. contain information about a movement and/or a rotation and/or a scaling of the object. The external model conditions may also contain predictions of the behavior of the transformation of the at least one object.

Further external model conditions may be e.g., comprise information about a visibility of at least one object and/or colors of the object. The interaction module 18 can be omitted.

The viewing device 3 furthermore comprises a protocol interpreter 19 and a mesh updater 20. The protocol interpreter 19 is designed to provide instructions according to the model updates for the mesh updater 20. The mesh updater 20 is designed to update a mesh of content to be visualized according to the instructions.

The mesh updater 20 can be designed to translate a transmission protocol specific format of the updated mesh into an engine specific mesh. The viewing device 3 also comprises a storage 21 designed to store and load the engine specific mesh. In this case, the engine 15 is designed to visualize the content based on the engine specific mesh. Depending on hardware, operating system and/or software runtime, the engine 15 will comprise different internal mechanisms and structures to store and visualize meshes. The aim is that the mesh is an as good fit as possible for the viewing device 3 it is visualized on. Therefore, the storage 21 stores the engine specific mesh by adapting the mesh such that it is compatible with the internal mechanisms and structures of the engine 15. E.g. the updated mesh may be stored such that it is adapted to a viewing device 3 using e.g. OpenGL or Direct3D. These two platforms have different internal mechanisms and structures to store and display meshes. The storage 21 can be designed to store the engine specific mesh in-memory. The mesh adapter 21 may be omitted.

The viewing device 3 may comprise another optional component which is a cache 22 provided for storing transmitted model updates or instructions based on the model updates. This allows for disconnected viewing without any interaction with the streaming server 2. The system 1 of FIG. 2 is designed such that the cache 22 can obtain instructions according to the model updates from the protocol interpreter 19 and provide them to the mesh updater 20. However, the cache 22 can obtain transmitted model updates directly from the streaming server 2 and provide them to the protocol interpreter 19. The cache 22 may also be omitted.

Figure 3:
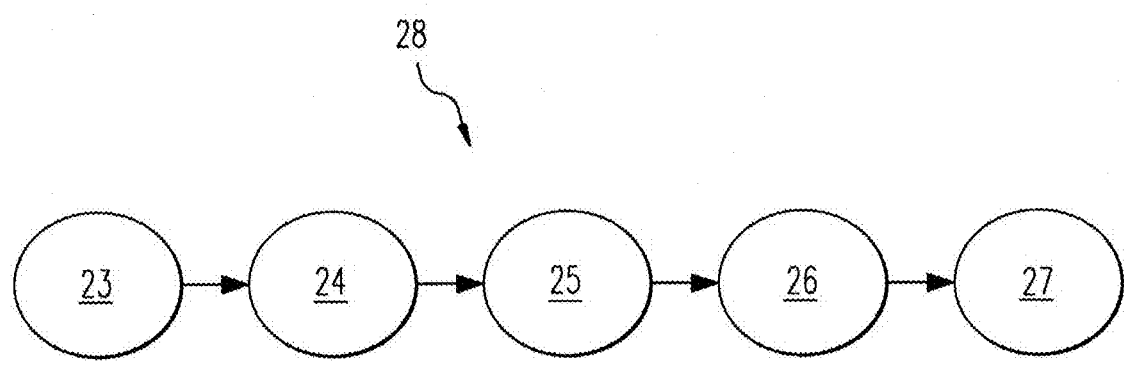
FIG. 3: shows method steps of a method for streaming content.

FIG. 3 schematically shows method steps 23, 24, 25, 26, 27 of a method 28 for streaming content. The method 28 can be performed by using the system 1 of FIG. 1 and FIG. 2. Therefore, the reference numerals of FIG. 1 and FIG. 2 are used in the description below.

In a first method step 23 the content is loaded on the streaming server 2. In a second method step 24 models of the content are generated. In a third method step 25 model updates are generated. In a fourth method step 26 the model updates are transmitted to a viewing device 3. In a fifth method step 27 the content is visualized according to the model updates. Generating the model updates is based on the models, acquired client metrics containing viewing device specific information and the client state containing information about previously transmitted model updates. When generating the model updates external interactions can also be considered by modifying the models according to external model conditions, too.

The model updates can e.g. contain information about a change of quantity and quality of the content according to the client metrics. E.g., if the viewing device 3 generates a resource pressure, i.e. that the viewing device 3 does not have sufficient resources like e.g. computing performance and/or memory, the model updates can contain information about how to remove parts of the content which are not visible. Alternatively or additionally, parts of the content can also be downscaled in their quality to relief resource pressure. In this case, the client state will be updated accordingly. If there is a connection pressure a quality of the model can be adapted, e.g. a model update containing information about downgrading a level of detail of visible content can be generated. Alternatively or additionally, parts of the content which are not visible can be removed due to connectivity pressure. The client state will be updated accordingly. If the model updates are queued before being transmitted to the viewing device 3 a model update containing information about upgrading a level of detail may be removed from the queue.

Figure 4:
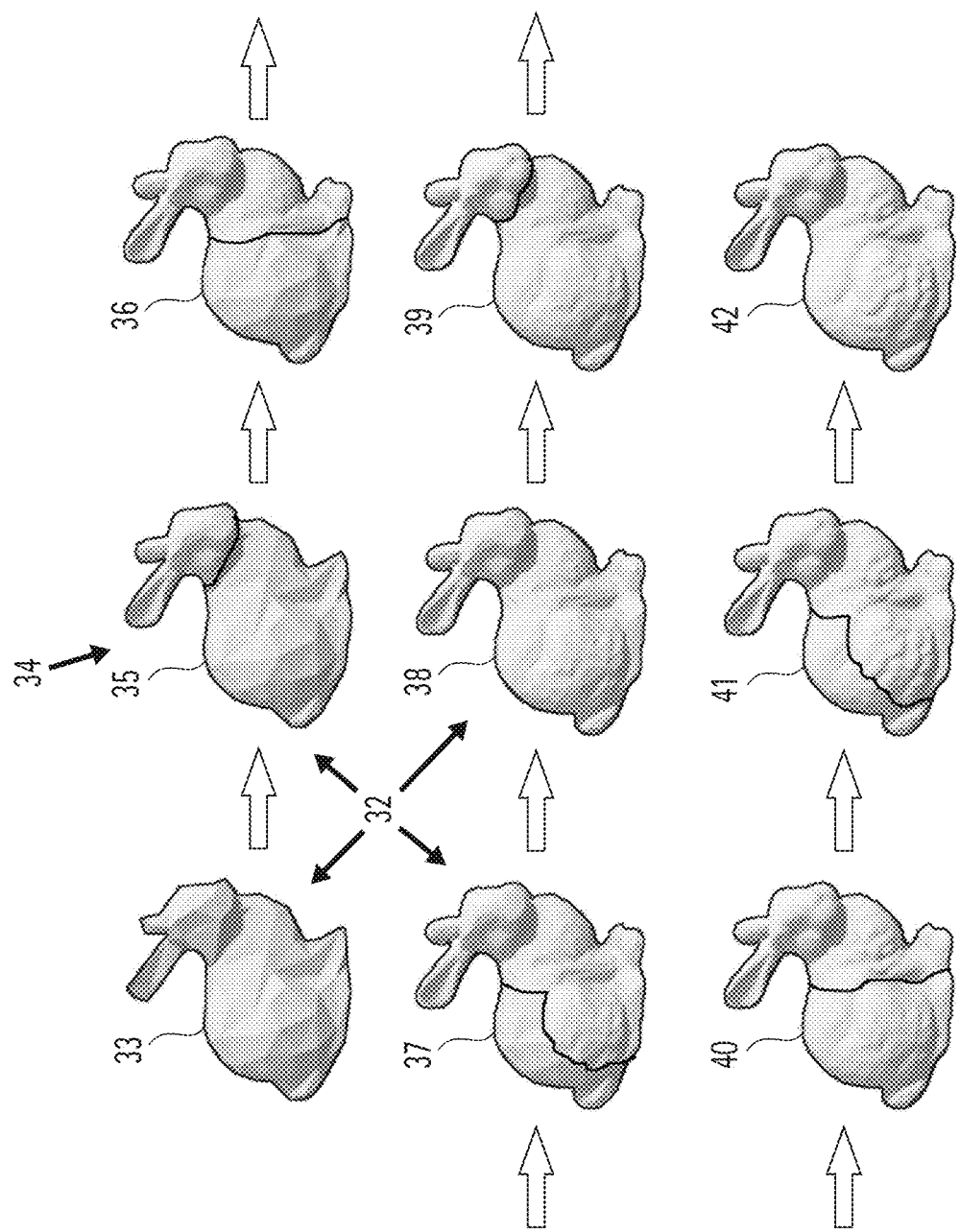
FIG. 4: shows an exemplary object being visualized by the system of FIGS. 1 and 2 according to an exemplary sequence of model updates.

As the streaming server 2 of the system 1 of FIGS. 1 and 2 is designed to transmit model updates to the viewing device 3 within the fourth method step 26 of the method 28 of FIG. 3, visualized parts of at least one object and/or the whole object can be updated sequentially. FIG. 4 schematically shows an exemplary object 32 being visualized by the system 1 according to an exemplary sequence 34 of model updates. The object 32 is visualized according to nine exemplary model updates, wherein different parts of the object 32 are visualized such that they comprise different quality levels successively.

The system 1 is designed to conditionally transfer and visualize only the part of the object 32 which is required at a given moment. Thus, the whole object 32 in all its details does not have to be transferred to the viewing device 3 before starting the visualization. Therefore, a first update 33 of the object 32 can be a rough mesh of the complete object 32 like shown in FIG. 4.

The sequence 34 of FIG. 4 comprises further model updates representing a simple example of adding incrementally more details to the object 32. Within a second update 35 the level of detail of a first part of the object 32 is increased, while the rest of the objects 32 is visualized using the rough mesh of the first update 33. Within a third update 36 the level of detail of only a second part of the object 32 is increased, wherein it comprises the same level of detail as the first part. The rest of the object 32 is visualized using the rough mesh of the first update 33. In a fourth update 37 and in a fifth update 38 the level of detail of a third part and a fourth part of the object 32 are increased, respectively. After the fifth update 38, all parts of the object 32 comprise the same level of detail, which is higher compared to the first update 33.

In a sixth update 39, a seventh update 40, an eighth update 41 and a ninth update 42, the level of detail of the first part, the second part, the third part and the fourth part of the object 32 is increased further, respectively. After the ninth update 42, all parts of the object 32 comprise the same level of detail, which is higher compared to the level of detail after the fifth update 38. Note, that the system 1 may also decide to downgrade parts of the object 32, e.g. due to restricted resources of the viewing device 3 and/or due to a connectivity pressure.

Figure 5:
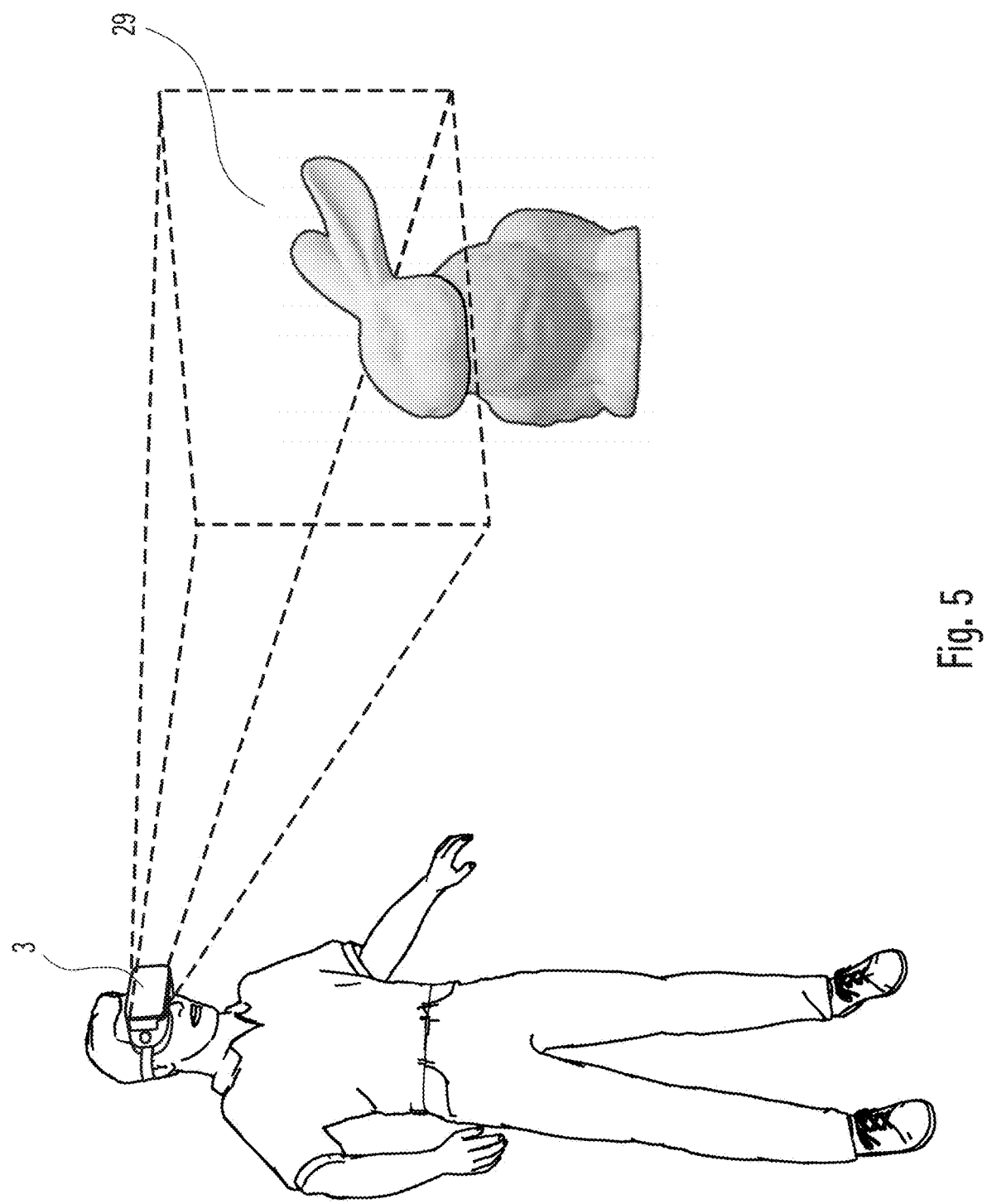
FIG. 5: shows the principle of frustum prioritized fragment sequencing.

The server can also decide to only send a fragment of the object 32 or only a part that the user can see, e.g. parts of the object that are in the visual frustum. FIG. 5 schematically shows the principle of frustum prioritized fragment sequencing. In this embodiment of the method 28, only parts of the model updates referring to a view frustum 29 are transmitted in a prioritized manner.

This kind of sequence of model updates ensures that fragments of a model that are within the view frustum 29 are send to the viewing device 3 before non-frustum fragments. However, sending non-frustum fragments allows for a preparative transfer of model updates. They may be transmitted e.g. in moments where the visible content does not need to be improved.

Figure 6:
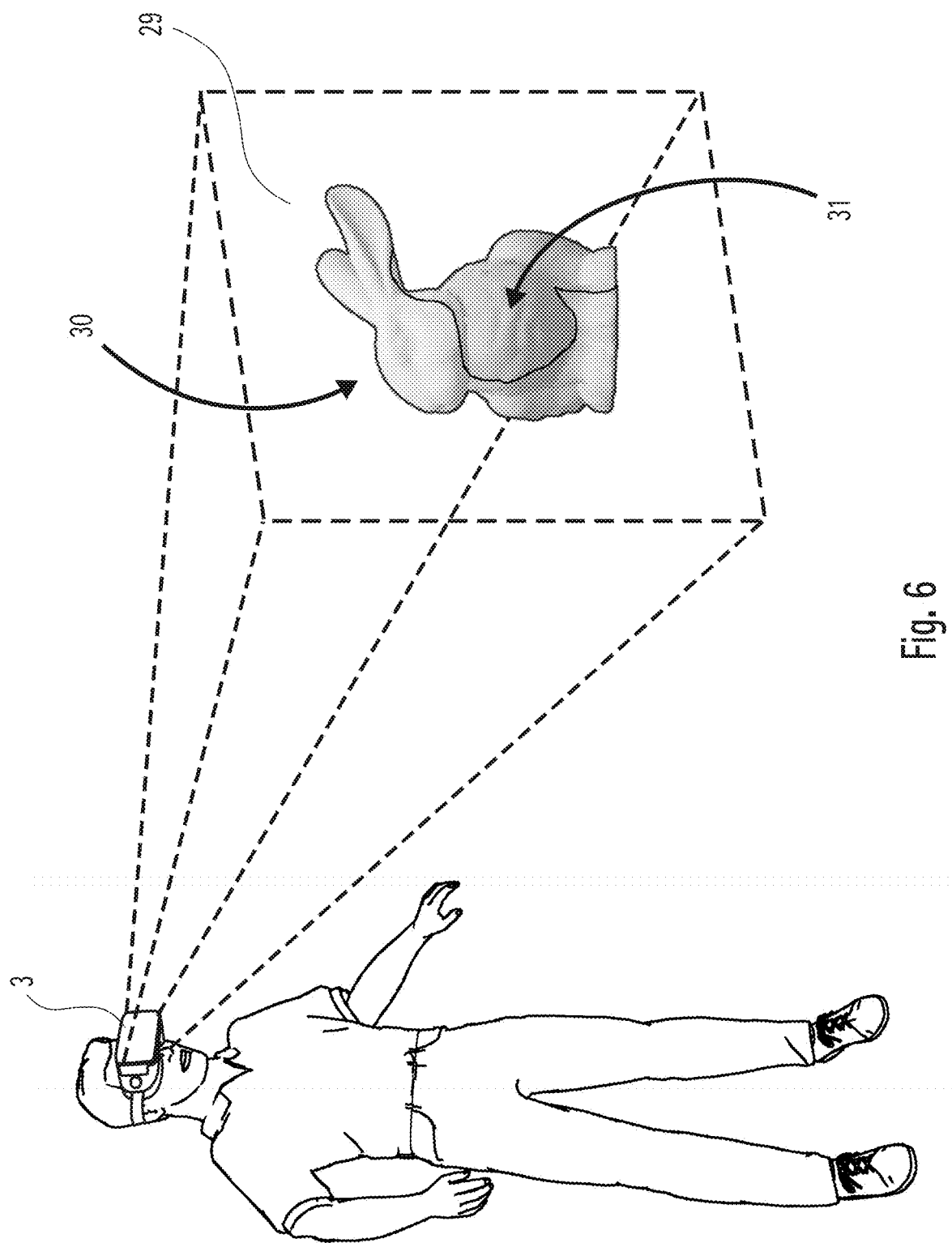
FIG. 6: shows the principle of occlusion prioritized fragment sequencing.

However, the decision module 12 of the streaming server 2 can also decide to degrade the quality of the object 32 or remove parts of the object 32 which are no longer visible. One example is shown in FIG. 6, which schematically shows the principle of occlusion prioritized fragment sequencing.

In this embodiment of the method 28, model updates referring to parts of the content that are to be visualized in a foreground 30 are transmitted in a prioritized manner. The decision module 12 can decide which parts of the content need to be added based on the camera position/rotation and view frustum 29 and fill the queue accordingly. Fragments 31 that are behind visible parts of the content which are in the foreground 30 from a perspective of a user of the viewing device 3 get a lower priority and are therefore send later to the viewing device 3. As the streaming server 2 can take into account the translation and the rotation of the viewing device 3 and the view frustum 29 it can correct the priority of fragments as long as they are queued on the streaming server 2 and not sent, yet.

As explained above, quality degradation may also be triggered by restricted resources of the viewing device and/or a connectivity pressure. On the other hand, by occlusion prioritized fragment sequencing invisible parts may be ignored until the visible parts have achieved sufficient quality on the viewing device 3 and there is still memory available to start transferring the occluded parts.

The system 1 e.g. can be used by augmented field workers who have to travel to a customer site at which they need to conduct an activity, e.g. troubleshooting or repair of an installation. By using the system 1 an augmented field worker will not only have access to textual or two dimensional (2D) information on a laptop or a smartphone, but can also use a head-mounted-display or the AR capabilities of the smartphone to access rich, detailed 3D information which assists him in doing his job well. Furthermore, augmented workers can already be guided through and trained on a production facility although the planned equipment is not yet physically but only digitally available as model.

LIST OF REFERENCE NUMERALS

1 system for streaming content
2 streaming server
3 viewing device
4 computer
5 smart phone
6 tablet
7 wearable glasses
8 first connection
9 second connection
10 import module
11 generation module
12 decision module
13 queue module
14 client state manager
15 engine
16 acquisition module
17 telemetry aggregation cache
18 interaction module
19 protocol interpreter
20 mesh updater
21 storage
22 cache
23 first method step
24 second method step
25 third method step
26 fourth method step
27 fifth method step
28 method for streaming content
29 view frustum
30 foreground of visualized content
31 fragments behind a visible content
32 object
33 first update
34 sequence
35 second update
36 third update
37 fourth update
38 fifth update
39 sixth update
40 seventh update
41 eighth update
42 ninth update

The invention claimed is:

1. A system for streaming content comprising:
a streaming server and
a viewing device,
wherein the streaming server comprises a generation module, a decision module, a client state manager and a telemetry aggregation cache, wherein the viewing device comprises an engine and an acquisition module, wherein the generation module is designed to generate models of imported content, wherein the decision module is designed to generate model updates, wherein the streaming server is designed to transmit the model updates to the viewing device, wherein the client state manager is designed to store a client state containing information about previously transmitted model updates, wherein the acquisition module is designed to acquire client metrics containing viewing device specific information and to continuously transmit the client metrics to the telemetry aggregation cache, wherein the decision module is further designed to generate the model updates based on the models, the client metrics and the client state, wherein the engine is designed to visualize content based on the model updates, wherein the viewing device comprises a protocol interpreter designed to provide instructions according to the model updates for a mesh updater of the viewing device, wherein the mesh updater is designed to update a mesh of content to form an updated mesh to be visualized according to the instructions.

2. The system according to claim 1,
wherein the acquisition module is designed to acquire the client metrics containing the information about available resources of the viewing device.

3. The system according to claim 1,
wherein the acquisition module is designed to acquire the client metrics containing the information about a connectivity of the viewing device.

4. The system according to claim 1,
wherein the acquisition module is designed to acquire the client metrics containing the information about a pose, a movement and a view frustum of the viewing device.

5. The system according to claim 1,
wherein the mesh updater is designed to translate a transmission protocol specific format of the updated mesh into an engine specific mesh,
wherein the viewing device comprises a storage designed to store and load the engine specific mesh,
wherein the engine is designed to visualize the content based on the engine specific mesh.

6. The system according to claim 1,
wherein the streaming server comprises a queue module designed to queue the model updates before they are transmitted to the viewing device.

7. The system according to claim 1,
wherein the generation module is designed to modify the models to form modified models according to external model conditions provided by an interaction module of the streaming server,
wherein the decision module is designed to consider the modified models when generating the model updates.

8. The system according to claim 1,
wherein the viewing device comprises a cache provided for storing and loading model updates.

9. A method for streaming content comprising:
loading the content on a streaming server,
generating models of the content,
generating model updates,
transmitting the model updates to a viewing device comprising a protocol interpreter designed to provide instructions according to the model updates for a mesh updater of the viewing device,
visualizing the content according to the model updates,
wherein generating the model updates is based on the models, acquired client metrics containing viewing device specific information and a client state containing information about previously transmitted model updates,
wherein the mesh updater updates a mesh of the content to be visualized according to the instructions.

10. The method according to claim 9,
wherein the model updates contain the information about a change of quantity and quality of the content according to the acquired client metrics.

11. The method according to claim 9,
wherein parts of the model updates referring to a view frustum are transmitted in a prioritized manner.

12. The method according to claim 9,
wherein the model updates referring to parts of the content that are to be visualized in a foreground are transmitted in a prioritized manner.

13. The method according to claim 9,
wherein the model updates are queued before being transmitted to the viewing device.

* * * * *